April 22, 1924.

A. O. ABBOTT, JR

TIRE SHAPING PRESS

Filed Oct. 17, 1922

INVENTOR.
ADRIAN O. ABBOTT, JR.

BY Ernest Hopkinson

HIS ATTORNEY.

Patented Apr. 22, 1924.

1,491,020

UNITED STATES PATENT OFFICE.

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN.

TIRE-SHAPING PRESS.

Application filed October 17, 1922. Serial No. 595,050.

*To all whom it may concern:*

Be it known that I, ADRIAN O. ABBOTT, Jr., a citizen of the United States, residing at Detroit, county of Wayne, and State of Michigan, have invented a certain new and useful Tire-Shaping Press, of which the following is a full, clear, and exact description.

This invention relates to apparatus for manufacturing tires, and more particularly, for the manipulation of molds incident to a shaping or curing treatment of the casings.

Heretofore, a so-called shaping treatment of the casings, which is performed without heat, or at least without steam under a substantial pressure, has been accomplished by clamping each mold with bolts or dumbbells introduced by hand while the molds lay on benches and individually inflating or applying fluid pressure to the interior of the tires within the molds. The present invention aims to provide a means for simultaneously applying fluid under pressure to the interior of casings, which are mounted in the molds, thereby to compact the wall thickness of the casings and render them less liable to blows in the subsequent operation of curing the casings while their interiors are subjected to air or gas under a high pressure. The apparatus simplifies, quickens and cheapens the shaping operation as heretofore performed and materially economizes in both labor and floor space.

Briefly, but without limiting intention, the invention consists in a horizontal press between whose platens a plurality of sectional molds may be clamped about tire casings. The mold sections are supported by travelling carriages in a vertical position and each section may be moved independently of the other. Means are provided on the sections for temporarily sustaining the casings to facilitate their mounting into position. And desirably, the device is coupled up with the movable platen of the press so as to separate the mold sections into batches or groups, allowing two or more gangs of men to have ready access for manipulating the sections and removing and introducing casings.

A preferred embodiment of the invention is illustrated in the accompanying drawings in which:—

Figure 1:
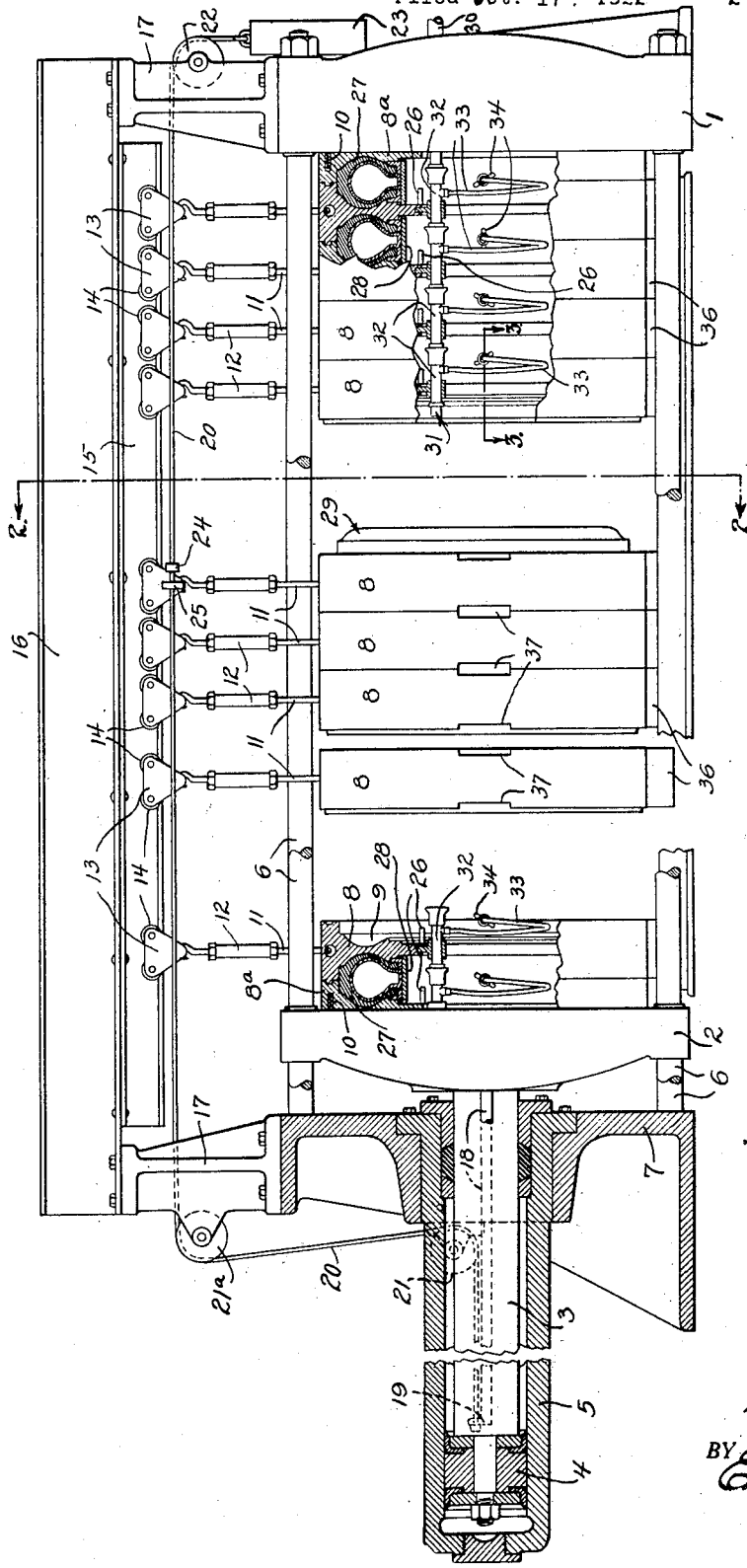
Fig. 1 is a side elevation, partly in section, of the apparatus, showing the press, a number of the mold sections and travelling supports for each of the latter.
Figure 2:
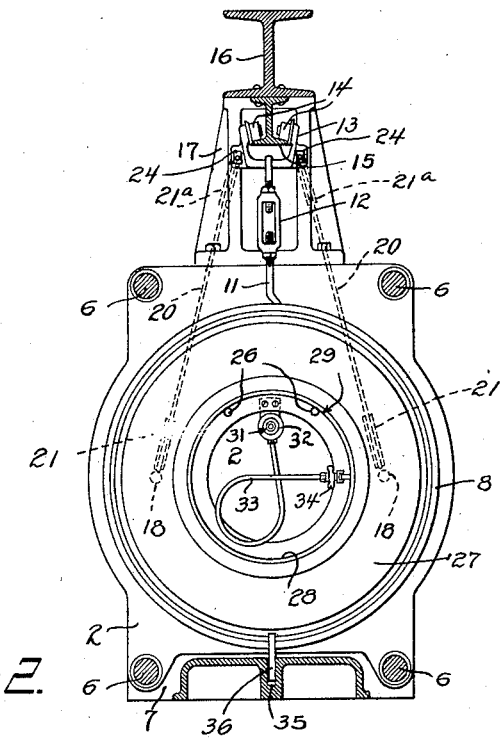
Fig. 2 is a section on the line 2—2, Fig. 1.
Figure 3:
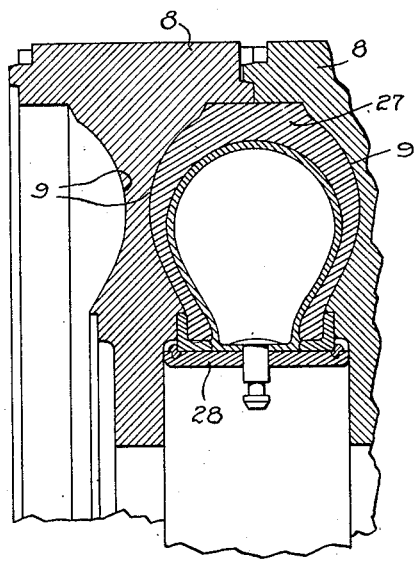

And Fig. 3 is a section on the line 3—3, Fig. 1.

The apparatus comprises a double-acting horizontal hydraulic press having a head or stationary platen 1 and movable platen 2, the latter being operated by a ram 3 and piston 4, which is reciprocable in a cylinder 5 suitably piped for movement of the piston in either direction. The movable platen 2 is supported and guided by four rods 6, which are anchored in the head 1 and a frame 7, respectively. Between the platens 1 and 2, a plurality of mold sections 8 are supported, each of these sections having on its opposite sides a grooved face 9 for shaping one side of the tire. The sections $8^a$ immediately adjacent each of the platens 1 and 2, are positively secured thereto, as indicated at 10. But each of the intervening sections 8 is supported by a hook 11 and adjustable connection, such as a turn-buckle 12, from a carriage 13 with rollers 14, or other suitable devices, tracking a rail 15, which is supported by a channeled beam 16, resting on blocks 17, which are bolted to the head 1 and frame 7.

While it is obvious that various forms of mold sections may be employed, I prefer the form shown in the drawings and more specifically disclosed in a United States patent to H. R. Gilson, No. 1,398,073, granted November 22nd, 1921.

A pair of rods 18 are secured to the movable platen 2, and to the free end 19 of each of these is secured one end of a cable 20, which passes around pulleys 21 and $21^a$, and horizontally above the molds close to the carriages 13 and over a pulley 22 at the outside end of the press where a counterweight 23 is secured to its other end. There are two of these cables 20 and intermediately each has secured thereto a collar 24, which is adapted to engage an apertured lug 25 on one of the carriages 13, the cables passing loosely through these apertured lugs 25. The mold sections remain stationary until the cylinder 5 and left-hand mold $8^a$ attached thereto have travelled about half the length of the opening stroke. At this time, the blocks 24 engage the lugs 25 and thereby shift the mold section which is hooked to that carriage together with all other mold sections lying in the path thereof. Thus, at the completion of the opening stroke, working spaces are provided between the movable platen and one group of the molds, and between the last-mentioned group of molds and the remainder of the molds.

Pins 26 projecting horizontally from one side of each of the mold sections are adapted to support the tires 27, which are usually mounted on sealing rings 28, when the mold sections are separated, as indicated at 29 on the drawings.

While a fluid pressure may be supplied to the interior of the molds or tires in any suitable manner, I prefer to supply the same from an outside valve-controlled pipe line 30, which is automatically coupled up, when the press is closed, to a header, indicated generally by the numeral 31, having sections 32 with inter-fitting ends, each section having an individual branch 33 and releasable connection 34, with a single mold. The specific construction of the sectional header is not a part of the present invention, being fully disclosed and claimed in my copending application Serial No. 589,450, filed September 20th, 1922. But it is to be understood that any form of manifolding system located either inside or outside of the molds or press and of a continuous or sectional type may be employed and is comprehended within my broad invention.

While not essential, I prefer to provide a guideway 35, extending longitudinally of the frame and located below the molds, for receiving tongues 36 affixed in any suitable manner to the mold sections 8, these serving to steady the same and maintain them in axial alignment without interfering with separation of the individual sections in the direction of their coincident axis. Notches 37 may also be provided in the parting lines between the sections for the insertion of bars and prying apart of the sections when they may be stuck together by the tread configuration of the casings as occasionally happens.

In operation, assuming that a treatment of the casings has just been completed, the platen 2 is shifted to the left to open the press. When it has travelled half—or any desired fraction—of its opening stroke, the collar 24, which is fixed to the cable 20, engages a lug 25 and causes the mold section therebeneath to be moved with the platen 2 to the left, necessarily in its movement shifting all mold sections in its path. On the completion of the opening stroke, working spaces are thus left between the left-hand mold section 8ª and the nearest mold section 8, and also between that mold section 8, which is below the lug 25, and the mold section to the right thereof which remains stationary. Gangs of men at these working spaces then empty and refill the molds as follows. In each of the working spaces, there is ordinarily a casing resting on the pins 26, which is removed and replaced by a non-treated casing. Then, the nearest mold section 8 is shifted by hand to confine the non-treated casing and to leave the next casing, which has been previously treated, accessible for removal in the working space created by the shift of said previously mentioned section 8. This accessible treated casing is then removed and replaced by a non-treated casing. These operations are continued until the entire batch of molds has been emptied and refilled. The platen 2 is then moved towards the head 1 and the entire batch of molds thereby clamped together. In closing the platens upon the molds, the sectional header 31 is automatically coupled up so that fluid may be supplied from the exterior to any one of the casings.

It will be obvious that many changes may be made in the details of the construction without departure from the principles underlying the invention and it is to be understood that all such changes are comprehended, such, for instance, as increasing the number of working spaces. Of course, the particular treatment by heat or pressure to which the molds are subjected may be varied and the invention includes "curing" as well as "shaping." Reference should be made to the accompanying claims for an understanding of the scope of the invention.

Having thus described my invention, what I claim and desire to protect my Letters Patent is:

1. An apparatus for treating tires comprising in combination, a horizontal press having at least one movable platen, a plurality of sectional molds, and means for sustaining the sectional molds between the platens and permitting the introduction and removal of tires by separation of the sections without removal thereof from the press.

2. An apparatus for treating tires comprising in combination, a horizontal press having at least one movable platen, a plurality of sectional molds, means for sustaining the sectional molds between the platens and permitting the introduction and removal of tires by separation of the sections without substantial transverse displacement, and means for conducting fluid under pressure to the interior of each mold.

3. An apparatus for treating tires comprising in combination, a press having platens at least one of which is shiftable, means for operating said shiftable platen, a plurality of sectional molds, means for sustaining the mold sections in substantially vertical planes and permitting independent movement of each in the direction of its axis when the press is open, the space between the platens of the press being accessible for permitting manipulation of the molds from the sides of the press.

4. An apparatus for treating tires comprising in combination, a press having platens at least one of which is shiftable, means for operating said shiftable platen, a plurality of sectional molds, means for sustaining the mold sections in substantially vertical planes and permitting independent movement of each in the direction of its axis when the press is open, and a manifold system for conducting fluid under pressure to the interior of each mold, the space between the platens of the press being accessible for permitting manipulation of the molds from the sides of the press.

5. An apparatus for treating tires comprising in combination, a horizontal press having platens at least one of which is shiftable, means for operating said shiftable platen, a plurality of sectional molds, means sustaining the mold sections in substantially vertical planes and permitting movement of the mold sections in the direction of their coincident axis, and means for shifting some of the mold sections independently of the others whereby to separate them into groups for access in emptying and refilling.

6. An apparatus for treating tires comprising in combination, a horizontal press having platens at least one of which is shiftable, means for operating said shiftable platen, a plurality of sectional molds, means sustaining the mold sections in substantially vertical planes and permitting movement of the mold sections in the direction of their coincident axis, and means for shifting some of the mold sections independently of the others whereby to separate them into groups for access in emptying and refilling, said last-named means including devices shiftable with the movable platen.

7. An apparatus for treating tire molds comprising in combination, a horizontal press having platens at least one of which is shiftable, means for shifting said platen, a plurality of sectional molds, means on said sectional molds for temporarily supporting a tire, and means for sustaining the mold sections substantially vertical but permitting independent axial shift of each.

8. An apparatus for treating tire molds comprising in combination, a horizontal press having platens at least one of which is shiftable, means for shifting said platen, a plurality of sectional molds, means on said sectional molds for temporarily supporting a tire, and means for sustaining the mold sections substantially vertical but permitting independent axial shift of each, and a header composed of sections separably connected with the interior of each mold for simultaneously supplying fluid under pressure to the interior of the molds.

9. An apparatus for treating tire molds comprising in combination, a horizontal press having platens at least one of which is shiftable, means for shifting said platen, a plurality of sectional molds, means on said sectional molds for temporarily supporting a tire, and means for sustaining the mold sections substantially vertical but permitting independent axial shift of each, and a header composed of sections separately connected with the interior of each mold for simultaneously supplying fluid under pressure to the interior of the molds, said sectional header being disposed within the annular space enclosed by said molds when clamped by the press.

10. An apparatus for treating tire molds comprising in combination, a horizontal press having platens at least one of which is shiftable, means for shifting said platen, a plurality of sectional molds, means on said sectional molds for temporarily supporting a tire, and means for sustaining the mold sections substantially vertical but permitting independent axial shift of each, said last-named means including a rail above the press and carriages movable along said rail.

11. An apparatus for treating tire molds comprising in combination, a horizontal press having platens at least one of which is shiftable, means for shifting said platen, a plurality of sectional molds, means on said sectional molds for temporarily supporting a tire, and means for sustaining the mold sections substantially vertical but permitting independent axial shift of each, said last-named means including a rail above the press carriages movable along said rail, and an adjustable connection between said carriages and the molds.

Signed at Detroit, county of Wayne, and State of Michigan, this 10th day of October, 1922.

ADRIAN O. ABBOTT, Jr.